(12) United States Patent
Yanazume et al.

(10) Patent No.: US 8,605,304 B2
(45) Date of Patent: Dec. 10, 2013

(54) IMAGE PROCESSING APPARATUS FOR SHUTTING DOWN POWER SUPPLY IN SAFE

(75) Inventors: Shinsuke Yanazume, Kanagawa (JP);
Rie Nakamura, Kanagawa (JP);
Yoshifumi Kawai, Kanagawa (JP);
Masateru Kumagai, Kanagawa (JP)

(73) Assignee: Ricoh Company, Ltd., Tokyo (JP)

( * ) Notice: Subject to any disclaimer, the term of this patent is extended or adjusted under 35 U.S.C. 154(b) by 514 days.

(21) Appl. No.: 13/029,418

(22) Filed: Feb. 17, 2011

(65) Prior Publication Data

US 2011/0205573 A1 Aug. 25, 2011

(30) Foreign Application Priority Data

Feb. 22, 2010 (JP) .................................. 2010-036120

(51) Int. Cl.
*G06F 1/26* (2006.01)
(52) U.S. Cl.
USPC .......... 358/1.14; 713/300; 713/310; 713/320; 713/321
(58) Field of Classification Search
USPC ................... 358/1.14; 713/300–340
See application file for complete search history.

(56) References Cited

U.S. PATENT DOCUMENTS

| 8,441,661 B2 * | 5/2013 | Nakamura et al. .......... 358/1.14 |
| 2004/0250149 A1 * | 12/2004 | Tsai et al. .................... 713/330 |
| 2009/0094469 A1 * | 4/2009 | Kitamrua ...................... 713/320 |
| 2013/0179708 A1 * | 7/2013 | Iwasaki et al. ............... 713/320 |

FOREIGN PATENT DOCUMENTS

| JP | 06-161610 | 6/1994 |
| JP | 2004-276588 | 10/2004 |

* cited by examiner

*Primary Examiner* — King Poon
*Assistant Examiner* — Lawrence Wills
(74) *Attorney, Agent, or Firm* — IPUSA, PLLC (57) ABSTRACT

In an image processing apparatus, a power control part shuts down power supply after a power shutdown condition is established. A prescript safe state transition part performs a prescript safe state transition process to shift previously set prescript parts to a predetermined safe state. A priority safe state transition part performs a priority safe state transition process to shift previously set priority parts to the safe state. A transition process control part causes the prescript safe state transition process to be executed before execution of the priority safe transition process, and causes the priority safe state transition process to be executed when a predetermined transition change condition is established in the prescript safe state transition process. The power control part shuts down the power supply after the completion of the prescript safe state transition process.

12 Claims, 7 Drawing Sheets

IMAGE PROCESSING APPARATUS FOR SHUTTING DOWN POWER SUPPLY IN SAFE

BACKGROUND OF THE INVENTION

1. Field of the Invention

The present invention relates to image processing apparatuses and, more particularly, to an image processing apparatus having a power supply shutdown function.

2. Description of the Related Art

In an image processing apparatus such as a printer, a copy machine, a multifunction peripheral, etc., if a main power is turned off by a power switch when various processes are being performed, a multifunction of the apparatus or data damage may occur. In order to eliminate such a malfunction or data damage, conventionally, the image processing apparatus is controlled so that a power switch cannot be turned off during an execution of a job.

Moreover, Japanese Laid-Open Patent Application No. 6-161610 (Patent Document 1) suggests a technique to stop an operating system (OS) after shutting down applications being in operation and before a backup power source of an uninterruptible power supply system runs down by monitoring the backup power source of the uninterruptible power supply system, and shift to a normal operation mode after a power supply to the uninterruptible power supply system is recovered.

However, in the technique suggested in the Patent Document 1, a process procedure necessary for shutting off a power is not taken into consideration because the technique is directed to only shutting down applications and stopping an operating system (OS). Thus, if a preparation process necessary for shutting down power (hereinafter, referred to as a shutdown preparation process) is associated with a plurality of processes, such as a process of protecting a scanner engine, a printer engine and other devices, a process of protecting a memory part, a process of cancelling a user request being processed, and a process of recording a log, it takes a long time to complete those processes. Accordingly, it is difficult to complete the shutdown preparation process including those processes within a limited time after a main power switch is turned off, which may result in producing a cause of malfunction and data damage.

SUMMARY OF THE INVENTION

It is a general object of the present invention to provide an improved and useful image processing apparatus in which the above-mentioned problem is eliminated.

A more specific object of the present invention is to provide an image processing apparatus which can appropriately shut off a power supply in safe.

In order to achieve the object, there is provided according to one aspect of the present invention an image processing apparatus including: a power supply switch configured to be operated to send an instruction to supply a power or shut down the power supply; a power control part configured to shut down the power supply after a predetermined power shutdown condition is established when the instruction to shut down the power supply is sent from the power supply switch; a prescript safe state transition part configured to perform a prescript safe state transition process to shift a predetermined number of previously set prescript parts among parts of the image processing apparatus to a predetermined safe state in which the power supply is shut down in safe in accordance with a predetermined transition procedure; a priority safe state transition part configured to perform a priority safe state transition process to shift a predetermined number of previously set priority parts among the parts of the image processing apparatus to the safe state in accordance with a predetermined transition procedure; and a transition process control part configured to cause said prescript safe state transition process to be executed before execution of the priority safe transition process, and cause the priority safe state transition process to be executed when a predetermined transition change condition is established in the prescript safe state transition process, wherein the power control part determines that the predetermined power shutdown condition is established when the prescript safe state transition process is completed, and shuts down the power supply after the completion of the prescript safe state transition process.

According to the present invention, the image processing apparatus can be shifted, according to a process procedure in which a priority of processing is taken into consideration, to a safe state where safety is maintained even when a power supply is shut off all of a sudden. Thus the image processing apparatus can appropriately shut down power supply in safe.

Other objects, features and advantages of the present invention will become more apparent from the following detailed description when read in conjunction with the accompanying drawings.

DETAILED DESCRIPTION OF THE PREFERRED EMBODIMENTS

A description will be given below, with reference to the drawings, of embodiments of the present invention.

Figure 1:
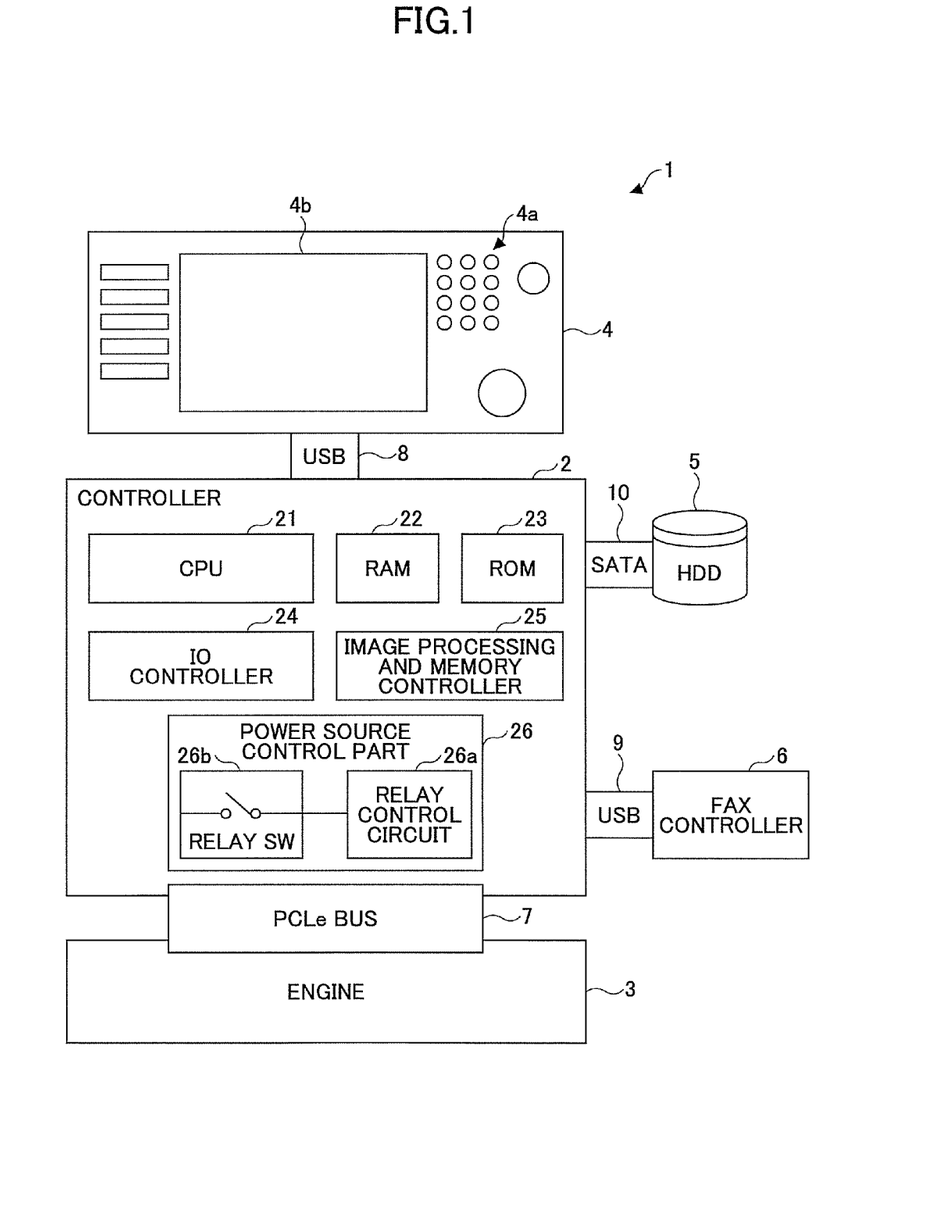
FIG. 1 is a block diagram of a multifunction peripheral according to an embodiment of the present invention.

FIG. 1 is a block diagram of a multifunction peripheral 1, which is an example of an image processing apparatus according to an embodiment of the present invention.

As illustrated in FIG. 1, the multifunction peripheral 1 includes a controller 2, an engine 3, and operation part 4 a hard disk drive (HDD) 5, and a facsimile (FAX) controller 6. The controller 2 and the engine 3 are connected to each other through a PCIe bus 7. The controller 2 and each of the operation part 4 and the FAX controller 6 are connected to each other through universal serial buses (USBs) 8 and 9, respectively. The controller and the hard disk drive 5 are connected to each other through a serial advanced technology attachment (SATA) 10. The controller 2 serves as a platform so that the engine 3, the operation part 4, the hard disk drive 5 and FAX controller 6, which are configured as plug-in devices, are disconnectably connected to the platform.

The controller 2 includes a central processing unit (CPU) 21, a random access memory (RAM) 22, a read only memory (ROM) 23, an IO controller 24, an image processing and memory controller 25 and a power control part 26.

The ROM 23 stores basic programs and a power control program according to the present embodiment and system data necessary for the programs. The CPU 21 performs functions as the multifunction peripheral 1 and also a power control process mentioned later by controlling the controller 2 and each part of the multifunction peripheral 1 while using the RAM 22 as a work memory.

The multifunction peripheral 1 is configured as an image processing apparatus which can perform a safe and appropriate shutdown process mentioned later by reading the power control program recorded on a computer readable recording medium and introducing the read power control program in the ROM 23. Such a recording medium includes a ROM, an electrically erasable and programmable read only memory (EEPROM), an erasable and programmable read only memory (EPROM), a flash memory, a flexible disk, a compact disc read only memory (CD-ROM), a compact disc rewritable (CD-RW), a digital versatile disc (DVD), a secure digital (SD) card, a magneto-optical disc (MO), etc. The power control program is a computer executable program, which is described by a legacy programming language such as assembler, C, C++, C#, Java (registered trademark) or an object-oriented programming language. The power control program may be distributed by storing in the above-mentioned recording media.

The IO controller 24 includes an application specification integrated circuit (ASIC), which provides a standard interface to connect to the PCIe bus. The ASIC realizes a transition system in which a seamless transition of the CPU 21 is achieved from a state where the CPU 21 is turned off to a state where the CPU 21 is turned on according to a start up factors such as the network, the USBs 8 and 9 and the SATA 10. The controller 2 sends a shutdown instruction to hardware connected to the controller 2 through the IO controller 24. The IO controller 2 is connected with various I/O parts such as various motors, clutches and various sensors provided in the multifunction peripheral 1.

The image processing and memory controller 25 applies a necessary image processing to input image data, and writes or reads the image data and other data in or from the hard disc drive 5.

The power control part 26, which corresponds to an example of power control means, is provided with a relay control circuit 26a and a relay switch (relay SW) 26b, etc. The relay switch 26b is interposed between a power supply cable, through which electric power is taken from a commercial power supply, and a power supply part of the multifunction peripheral 1 in order to open and close a power supply line from the commercial power supply to the power supply part. The power supply part converts the electric power taken from the commercial power supply into a voltage and a current necessary for the multifunction peripheral 1, and supplies the adjusted electric power to each part of the multifunction peripheral 1. Even if the main power switch of the multifunction peripheral 1 is turned off, the power control part 26 supplies or shuts down power to the controller 2 and the engine 3, the operation part 4, the hard disk drive 5 and the FAX controller 6, which are plug-in devices, according to a power control process mentioned later by the relay control circuit 26a controlling on/off of the relay switch 26b.

The engine 3 outputs and prints an image onto a print paper in accordance with print data received from the controller by using a predetermined printing method such as, for example, an electrophotographic recording method, an inkjet recording method, etc. For example, if an image formation is performed according to an electrophotographic recording method, the engine 3 is provided with component parts necessary for outputting and recording the print data on a print paper according to the electrophotographic recording method, such as, for example, a photoconductor, a charge part, an optical write part, a development part, a transfer part, a fixing part, and a cleaning part. The engine 3 operates the charge unit to charge the surface of the photoconductor, and also operates the optical write part based on the print data sent from the controller 2 through the PCIe bus 7 to form a latent image on the charged surface of the photoconductor. A toner is supplied from the development part to develop the latent image to form a toner image. Then, the engine 3 feeds a print paper from a paper supply part to a position between the photoconductor and the transfer part to transfer the toner image formed on the photoconductor to the print paper. The print paper having the transferred toner image is conveyed to the fixing part, where the toner image on the print paper is fixed by heat and pressure, thereby forming a visible fixed image on the print paper. Finally, the engine 3 ejects the print paper having the fixed image onto a paper eject tray.

The operation part 4 is provided with various operation keys 4a necessary for operating the multifunction peripheral 1, a display unit 4b such as, for example, a liquid crystal display (LCD), and lamps such as LEDs for indicating an operation state of the multifunction peripheral 1. Various commands are input through the operation keys 4a to operate the multifunction peripheral 1. The operation part 4 displays on the display unit 4b contents of commands input through the operation keys 4a and various kinds of information to notify a user. The display unit 4b may be provided with a touch panel so that an input operation is performed by a touch operation on function buttons displayed on the touch panel.

The hard disk drive 5 has a predetermined memory capacity to store image data and other data. The recording operation of the image data and other data is performed mainly by the image processing and memory controller 25 of the controller 2.

The FAX controller 6 is connected with a public telephone line. The FAX controller 6 performs facsimile functions such as capture of a line, transmission of a selected signal which is a telephone number of a destination, automatic call reception by detecting incoming call to respond to the incoming call, automatic call sending to a line. Additionally, the FAX controller 6 exchanges facsimile control signals with a remote facsimile apparatus and performs G3 or G4 facsimile communication protocol.

Figure 2:
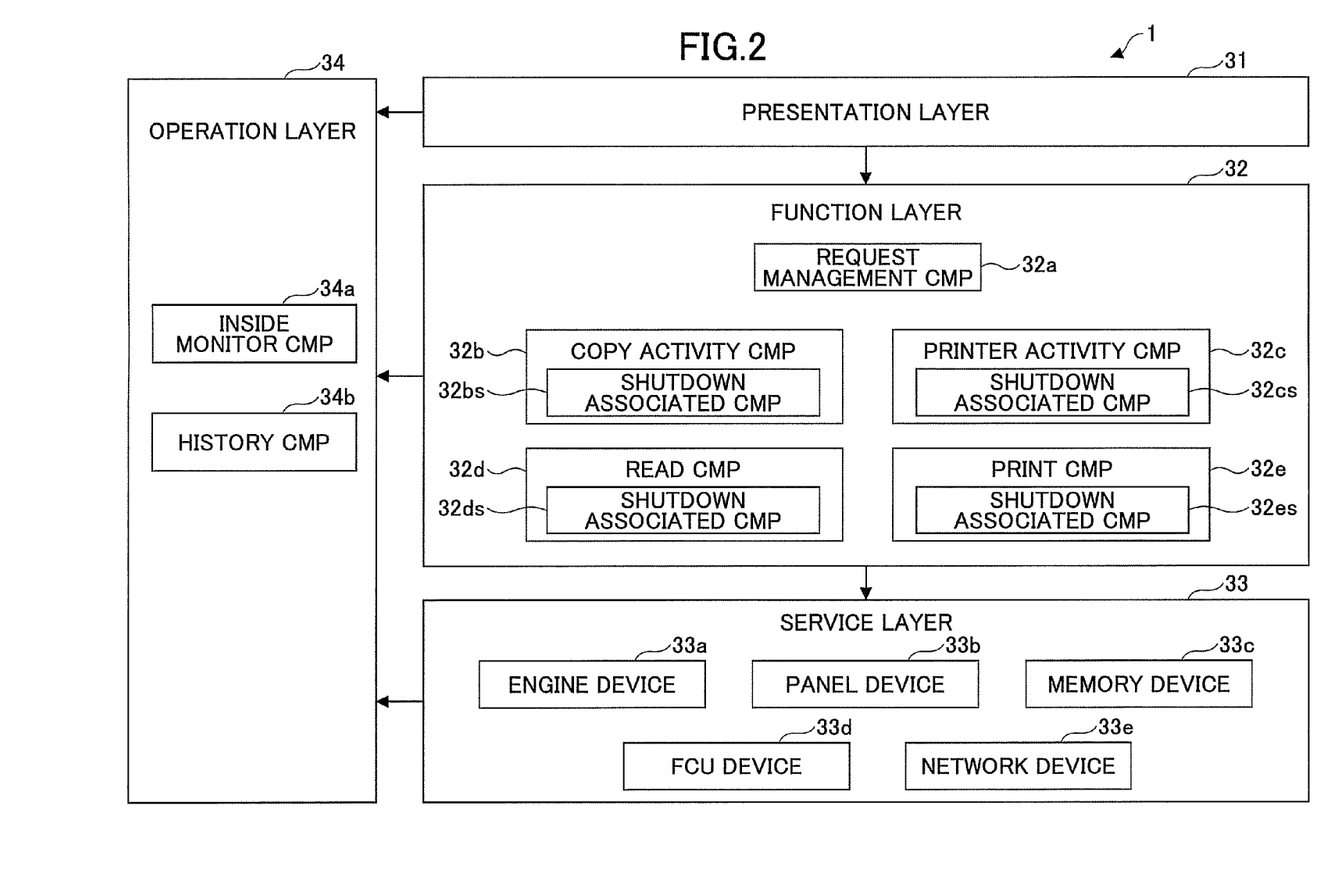
FIG. 2 is a structure diagram of software of the multifunction peripheral illustrated in FIG. 1.

As illustrated in FIG. 2, the software structure of the controller 2 of the multifunction peripheral 1 is roughly divided into a presentation layer 31, a function layer 32, a service layer 33, and an operation layer 34. The presentation layer 31 provides a user interface and controls, for example, a display of an operation screen in various operations as the multifunction peripheral 1 and a display of a power off transition screen in the power control process. The function layer 32 assembles and performs a function of providing components (CMPs). The function layer 32 includes a request management CMP 32a and a copy activity CMP 32b, a printer activity CMP 32c, a read CMP 32d, and a print CMP 32e, which are provided for plug-in. The copy activity CMP 32b, the printer activity CMP 32c, the read CMP 32d and the print CMP 32e include shutdown associated CMPs 32bs, 32cs, 32ds and 32es, respectively. The request management CMP 32a manages requests input to the multifunction peripheral 1, and sends an instruction to cancel jobs being currently performed to the shutdown associated CMPs 32bs, 32cs, 32ds and 32es at the time of shutdown. The copy activity CMP 32b, the printer activity CMP 32c, the read CMP 32d, and the print CMP 32e are modules for managing the plug-in which can be installed or uninstalled in the multifunction peripheral 1. The copy activity CMP 32b is a component which provides a copy function. The printer activity CMP 32c is a component which provides a printer function. The read CMP 32d is a component which provides a copy function. The printer activity CMP 32c is a component which provides a printing function in a printer. Each of the shutdown associated CMPs 32bs, 32cs, 32ds and 32es cancels a job according to a request by the request management CMP 32a at the time of shutting down in order to serve as prescript safe state transition means and priority safe state transition means to shift to a shutdown preparation completion state, which is a safe state.

The request management CMP 32a, which corresponds to an example of transition process control means, is a module to manage requests input to the multifunction peripheral 1. The request management CMP 32a sends an instruction to cancel jobs currently being executed to the shutdown associated CMPs 32bs, 32cs, 32ds and 32es at the time of shutdown.

The service layer 33 is a layer which provides common services used by the function layer 32, and provides an engine device 33a, a panel device 33b, a memory device 33c, an FCU device 33d and a network device 33e. Each of the engine device 33a, the panel device 33b, the memory device 33c, the FCU device 33d and the network device 33e is a driver of hardware.

The operation layer 34 is provided with items associated with an entire system, which is difficult to localize, such as an inside monitor CMP 34a, a history CMP 34b, etc. The inside monitor CMP 34a (power control means) arbitrates devices and components related to a state of electric power in order to manage the electric power state of the multifunction peripheral 1. Especially, the inside monitor CMP 34a makes a determination whether to shut down and performs a shutdown. The inside monitor CMP 34a recognizes a process (hereinafter, referred to as a prescript shutdown preparation process) which is the minimum required for maintaining the multifunction peripheral 1 in normal and which must be prepared for shutdown. The inside monitor CMP 34a also recognizes a process (hereinafter, referred to as a priority shutdown preparation process) which is not always performed but may result in loss of data and which is preferentially prepared for shutdown. The inside monitor CMP 34a changes from the prescript shutdown preparation process to the priority shutdown preparation process when a designated shutdown process change condition is established. The history CMP 34b records a log.

A description will be given below of a shutdown process according to the present embodiment.

Figure 3:
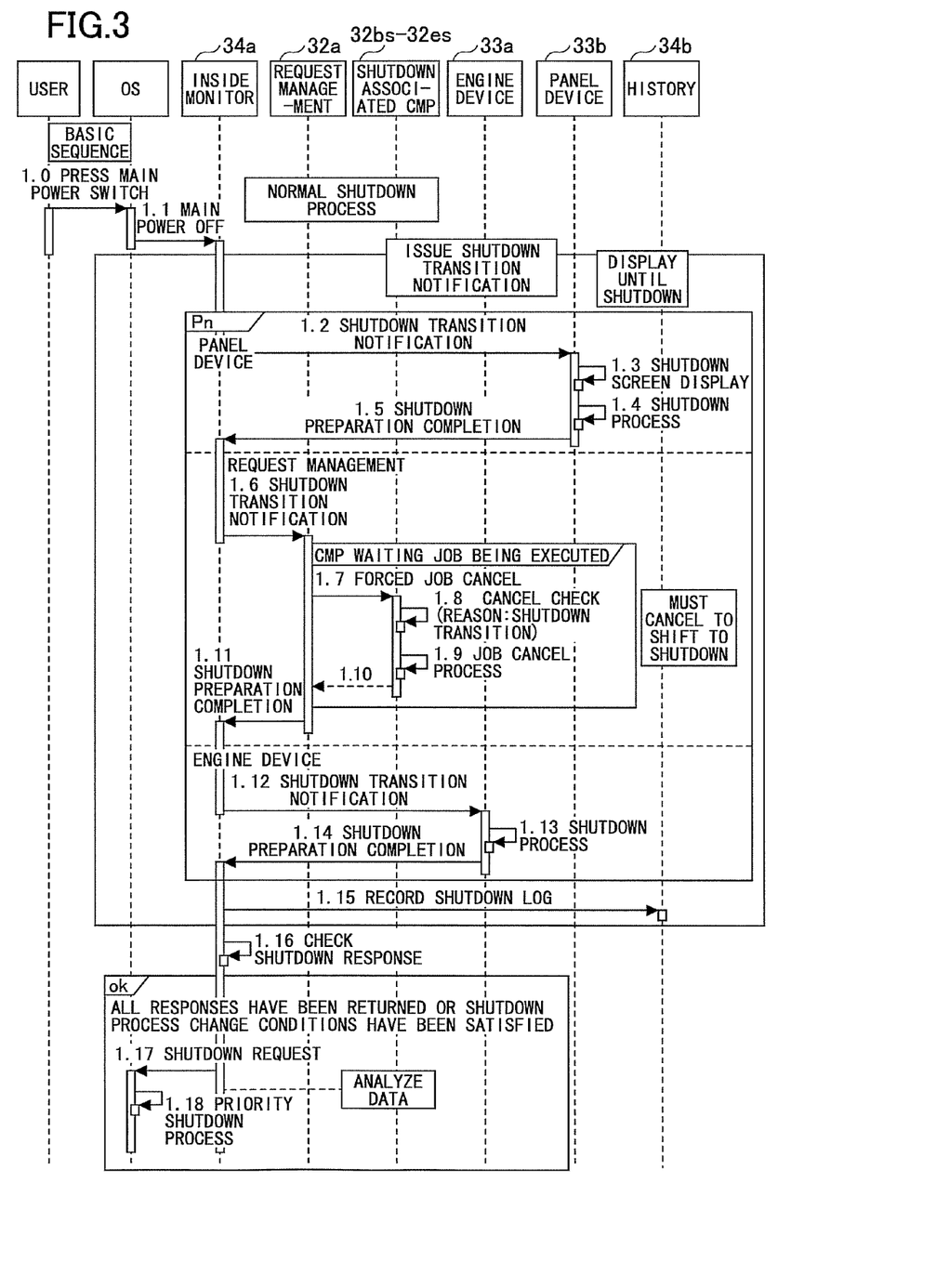
FIG. 3 is a sequence chart of a shutdown control performed in the multifunction peripheral illustrated in FIG. 1.

The multifunction peripheral 1 performs a power control sequence illustrated in FIG. 3 when a user presses a main power key (power switch means) to turn off. In FIG. 3, numbers "1.0-1.18", which are attached to the descriptions of processes, indicate step numbers of the processes, and are recited as "S1.0-S1.18" in the following description.

As illustrated in FIG. 3, when the main power key is pressed (S1.0), the operating system (OS) of the multifunction peripheral 1 recognizes that the main power key is pressed and sends an instruction to the inside monitor CMP 34a to shutdown a main power supply (S1.1). In the following description, the shutdown of the main power supply may be simply referred to as shutdown. Then, the inside monitor CMP 34a performs prescript shutdown preparation process (S1.2-S1.4). In the prescript shutdown preparation process, a shutdown transition notification is issued to the shutdown notification target components (CMPs), which are previously registered as prescript parts (prescript components), according to a previously set process procedure to make a preparation for shutdown. In the prescript shutdown preparation process, a display process of displaying to a user that the shutdown process is being performed, a job cancel process of canceling jobs currently being executed, an engine shutdown process, and a log record process of recording a shutdown log are performed.

Figure 4:
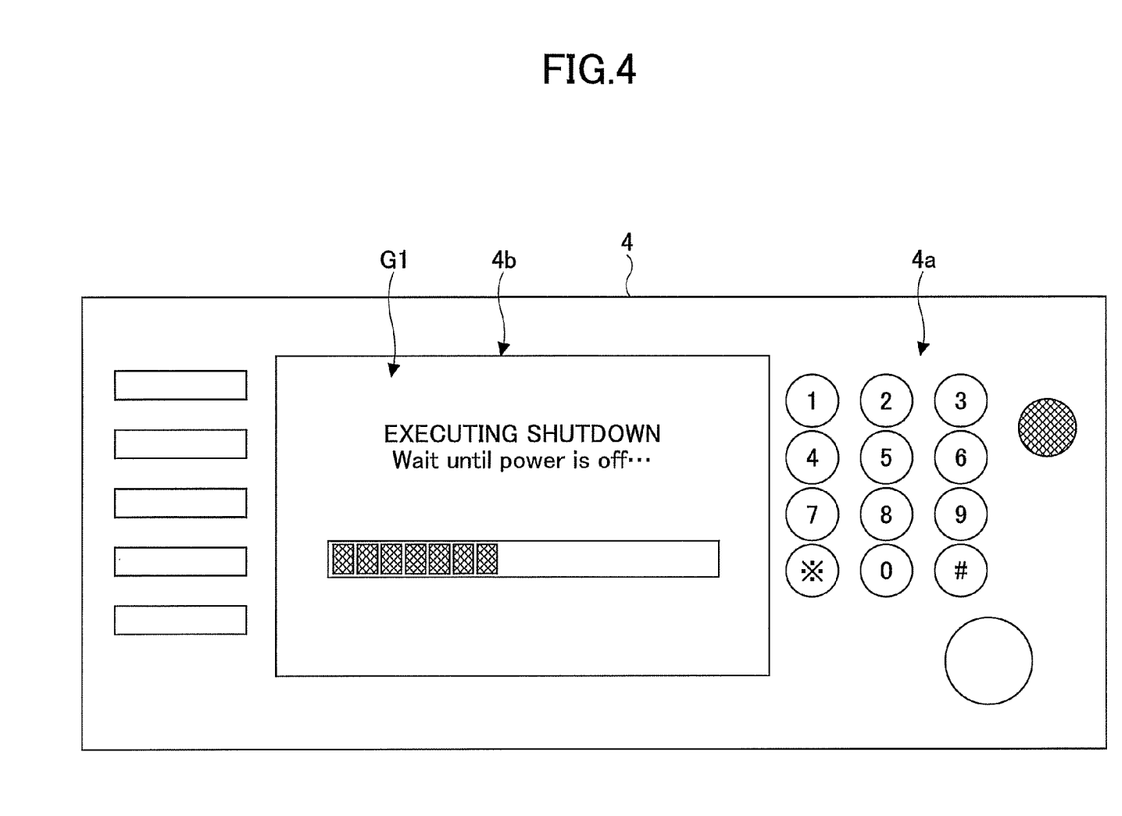
FIG. 4 is an illustration of a display screen during a shutdown process.

Then, the inside monitor CMP 34a sends a shutdown transition notification to the panel device 33b (S1.2). Upon receipt of the shutdown transition notification, the panel device 33b performs a display process to display, for example, a shutdown display screen G1 as illustrated in FIG. 4, which indicates that a shutdown is being performed and a progress in the shutdown operation (S1.4). After completion of the shutdown preparation, the panel device 33b sends a shutdown preparation completion notification (a notification of shutdown preparation completion information) to the inside monitor CMP 34a (S1.5). Then, the inside monitor CMP 34a sends a shutdown transition notification to the request management CMP 32a (S1.6).

Upon receipt of the shutdown transition notification, the request management CMP 32a sends an instruction to perform a forced job cancellation to the shutdown associated CMPs 32bs through 32es of the components 32b through 32e, which have jobs currently being executed (S1.7). Each of the shutdown associated CMPs 32bs through 32es checks whether the jobs of each can be cancelled (S1.8), and performs a process of sequentially cancelling the jobs, which are determined to be cancelled (S1.9), and, then, sends a preparation completion notification to the request management CMP 32a (S1.10) after cancelling all jobs, which are determined to be cancelled.

Upon receipt of the shutdown preparation completion notification from all of the shutdown associated CMPs 32bs through 32es, the request management CMP 32a sends a shutdown preparation completion notification to the inside monitor CMP 34a (S1.11). Then, upon receipt of the shutdown preparation completion notification from the request management CMP 32a, the inside monitor CMP 34a sends a shutdown transition notification to the engine device 33a (S1.2)

Upon receipt of the shutdown transition notification from the inside monitor CMP 34a, the engine device 33a performs the shutdown preparation process (S1.13), and sends a shutdown preparation completion notification to the inside monitor CMP 34a (S1.14) after the shutdown preparation is completed.

Upon receipt of the shutdown preparation completion notification from the engine device 33a, the inside monitor CMP 34a records a shutdown log in the history CMP 34b (S1.15), and checks the shutdown responses to determine whether the shutdown response is received from all of the shutdown notification target components (CMPs) and whether a shutdown process change condition previously set is satisfied (S1.16)

Upon receipt of the shutdown preparation completion notification from all of the prescript shutdown components (CMPs) or satisfaction of the previously set shutdown process change condition, the inside monitor CMP 34a sends a shutdown request to the operating system (OS) (S1.17). Upon receipt of the shutdown request from the inside monitor CMP 34a, the operating system (OS) performs a priority shutdown preparation process (S1.18). The priority shutdown preparation process is necessary for maintaining the multifunction peripheral 1 in a normal state and must be performed immediately before stopping a power supply. Thus, the priority shutdown preparation process cannot be performed before the prescript shutdown preparation process. However, in order to maintain the multifunction peripheral 1 in a normal state before shutting down a main power supply, the priority shutdown preparation process must be performed prior to other processes. The priority shutdown preparation process includes, for example, a data protection process.

Thus, the operating system (OS) sends the shutdown transition notification to one or more of the shutdown associated CMPs 32*bs* through 32*es* of the CMPs 32*b* through 32*e*, which are related to the data protection, in a predetermined order to cause them to perform the priority shutdown preparation process (priority safe state transition process such as a data protection process. Thereafter, the operating system (OS) performs a shutdown operation.

Figure 6:
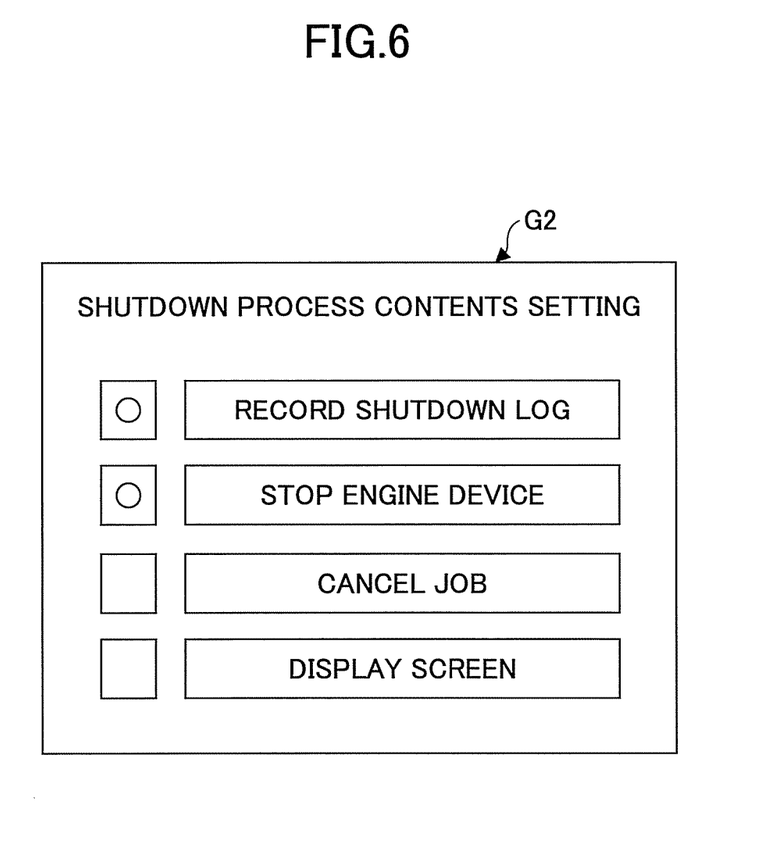
FIG. 6 is an illustration of a specific shutdown process setting screen.

The shutdown process change condition includes "passage of a fixed time (transition time)", "completion of a specific process", and "a user's request". If one of the conditions is satisfied, the inside monitor CMP 34*a* performs a change to the shutdown preparation process (a change from the prescript shutdown preparation process to the priority shutdown preparation process). The condition "passage of a fixed time" indicates that a fixed time has passed after an instructing operation to stop a power supply is performed through the main power key. The fixed time can be set through an operation applied to the operation part 4, if necessary. The condition "a user's request" indicates that the user made the shutdown process change request through an operation applied to the operation part 4. The condition "completion of a specific process" indicates that a specific process set by a user is completed. If a specific shutdown process setting mode is selected by a key operation applied to the operation part 4, the multifunction peripheral 1 displays, for example, a specific shutdown process setting screen illustrated in FIG. 6 on the display unit 4*b* of the operation part 4. Then, if a specific process, which the user desires to request to process during a prescript shutdown, is designated by a touch operation or a key operation applied to the specific shutdown process setting screen G2, the specific prescript process is stored in a nonvolatile memory as a specific prescript shutdown preparation process of the shutdown process change condition.

Figure 5:
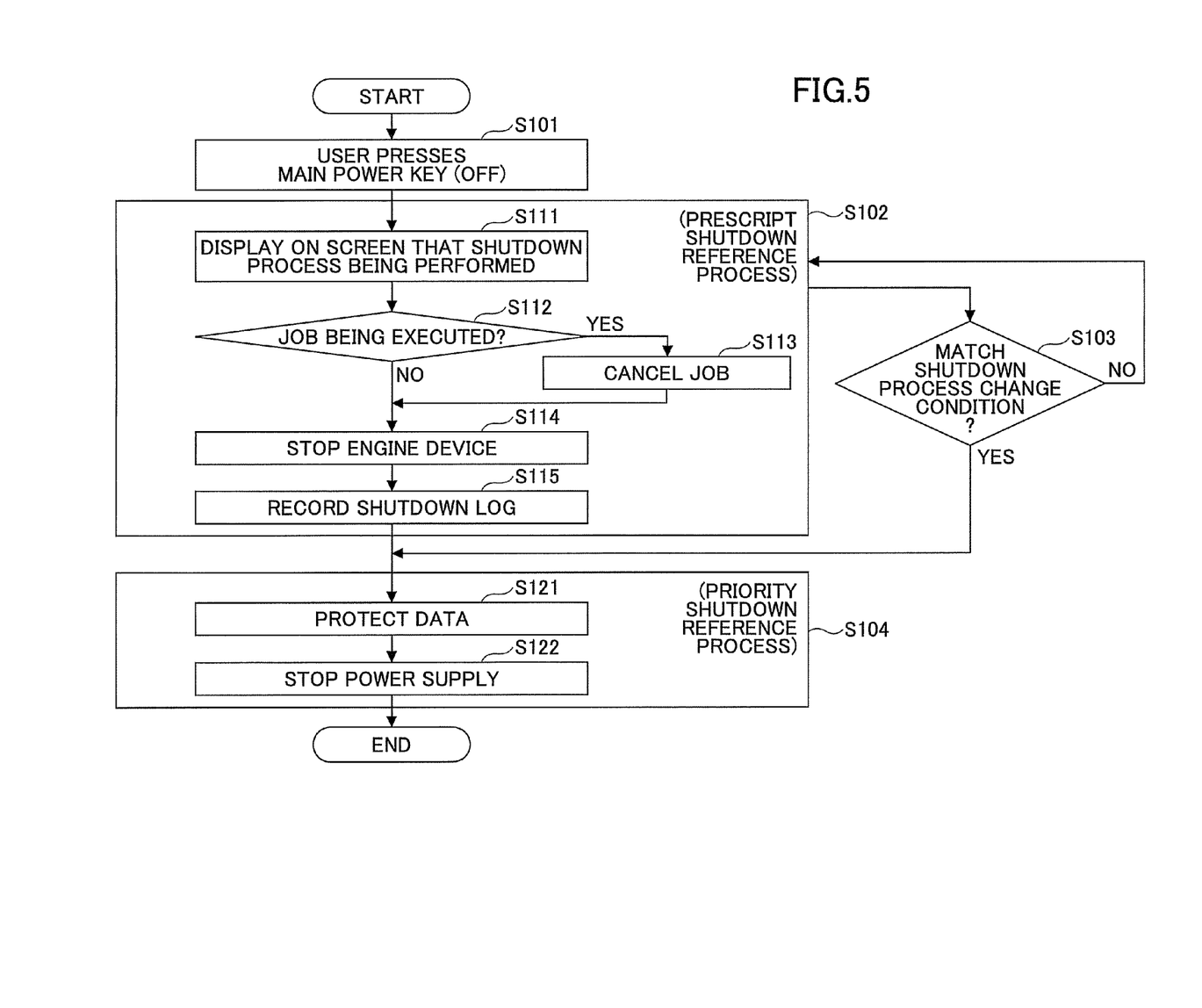
FIG. 5 is a flowchart of the shutdown process.

The multifunction peripheral 1 performs the shutdown process as indicated in FIG. 5. That is, if a main power supply shutoff is instructed by the user pressing the main power key (step S101), the multifunction peripheral 1 starts to perform the prescript shutdown preparation process (step S102). After the prescript shutdown is started, it is checked whether the shutdown process change condition is satisfied (step S103). If the shutdown process change condition is not satisfied, the prescript shutdown preparation process is continued. The check whether the shutdown process change condition is satisfied is performed, for example, at a predetermined each timing during the prescript shutdown preparation process.

Then, the multifunction peripheral 1 performs a shutdown process of the display, which is the operation part 4, as the prescript shutdown preparation process in order to have the display unit 4*b* of the operation par 4 to display the shutdown display screen G1 illustrated in FIG. 4 (step S111). Then, it is checked whether there is a job currently being executed (step S112). If there is a job currently being executed, the job is cancelled (step S113). If the cancellation of the job is completed in step S113 or if it is determined that there is no job currently being executed in step S112, the multifunction peripheral 1 has the engine device 33*a* to stop (step S114). Then, a log of the shutdown process (shutdown log) is recorded (step S115), and the prescript shutdown preparation process is ended.

When the prescript shutdown preparation process is ended or in the middle of the prescript shutdown preparation process, and it is determined in step S103 that the shutdown process change condition is satisfied, the multifunction peripheral 1 makes a transition to a priority shutdown preparation process mode to perform the priority shutdown preparation process (step S104). Then, the multifunction peripheral 1 protects data in the priority shutdown preparation process (step S121). After performing the priority shutdown preparation process, the multifunction peripheral 1 shuts down the power supply and ends the process (step S122).

Figure 7:
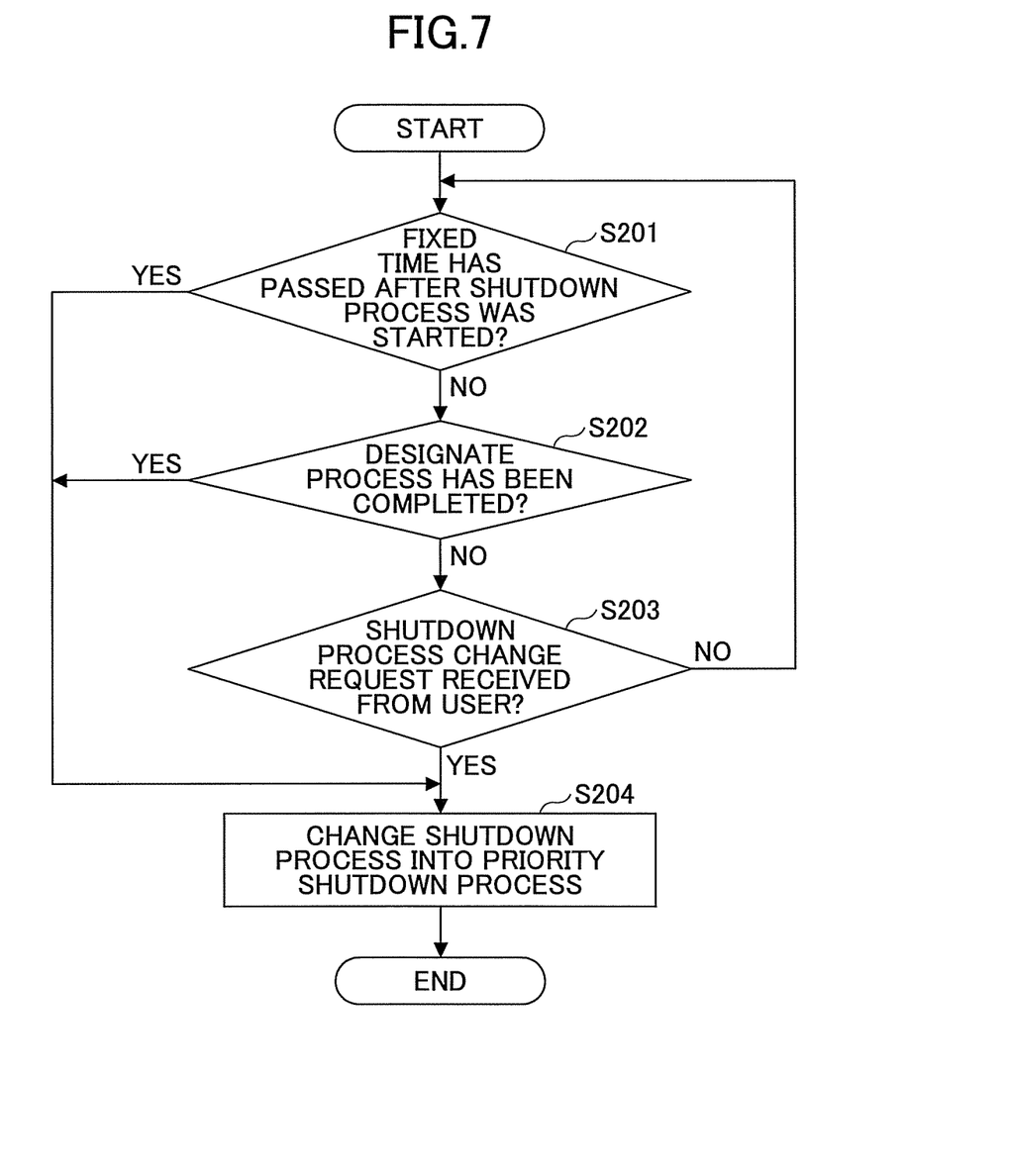
FIG. 7 is a flowchart of a shutdown process change condition determination process.

Then, the multifunction peripheral 1 performs the above-mentioned shutdown process change condition determination process as illustrated in FIG. 7. That is, the multifunction peripheral 1 checks whether a fixed time has passed after the shutdown process is started (step S201). If the fixed time has not passed, it is determined whether a specific prescript process previously designated is completed (step S202). If it is determined in step S202 that the specific prescript process is not completed, the multifunction peripheral 1 determines whether the shutdown process change request was made by a key operation of a user on the operation part 4 (step S203). If it is determined that the shutdown process change request was not made, the process returns to step S201 and the above-mentioned process (steps S201-S203) is repeated.

If it is determined in step S201 that the fixed time has passed, if it is determined in step S202 that the designated specific prescript process is completed, or if it is determined in step S203 that the shutdown process change request is made by the user, the multifunction peripheral 1 makes a change from the prescript shutdown preparation process to the priority shutdown preparation process (step S204).

As mentioned above, when a shutdown of power supply is instructed by an operation of the main power switch, the multifunction peripheral 1 according to the present embodiment defers the shutdown of power supply until a predetermined power shutdown condition is met. Then, the multifunction peripheral 1 first performs the prescript shutdown preparation process (prescript safe state transition process) to shift a predetermined prescript part from among parts of the multifunction peripheral 1 such as the engine 3, the operation part 4, the hard disk drive 5, the FAX controller 6, etc., to a predetermined shutdown preparation completion state (safe state) in which safety is maintained even if a power supply is shut down. Then, if a predetermined shutdown process change condition (transition change condition) is established during execution of the prescript shutdown preparation process, the shutdown preparation process is switched to the priority shutdown preparation process (priority safe state transition process) in which a predetermined priority part among parts of the multifunction peripheral 1 is shifted to a shutdown preparation completion state. When the priority shutdown preparation process is completed, it is determined that the power shutdown condition is established and, thus, a power supply is shut down by the power control part 26.

Accordingly, the multifunction peripheral 1 can be shifted to the safe state where safety is maintained if a power supply is shut down in a process procedure in which an importance of process is taken into consideration. Thereby, a safe and appropriate shutdown of power supply can be achieved.

Moreover, the multifunction peripheral 1 according to the present embodiment can set a desired part among parts of the multifunction peripheral 1 as a prescript part which is to be subjected to a shutdown preparation process according to the prescript shutdown preparation process. Therefore, the priority shutdown preparation process is performed to shut down power after a particularly important part is shifted to a shutdown preparation completion state, thereby surely maintaining safety with a short shutdown time.

Furthermore, the multifunction peripheral 1 according to the present embodiment switches a shutdown preparation process to execute from the prescript shutdown preparation process to the priority shutdown preparation process based on the shutdown process change condition (transition change condition) that a previously set fixed time (transition time) has passed after an instruction of power supply shutdown is made by an operation of the main power key. Therefore, safety of the system when shutting down can be surely maintained without the user's intention, and the shutdown preparation process of the priority part can be performed appropriately by effectively using the shutdown preparation time when shutting down the power supply.

Moreover, the multifunction peripheral 1 according to the present embodiment switches a shutdown preparation process to execute from the prescript shutdown preparation process to the priority shutdown preparation process based on the shutdown process change condition that transition of a previously set specific prescript part is completed in the prescript shutdown preparation process. Therefore, a minimum process required to be executed from among shutdown preparation processes can be executed by priority, thereby maintaining the multifunction peripheral 1 in a normal state.

Further, the multifunction peripheral 1 according to the present embodiment can set a desired part among parts of the multifunction peripheral 1 as a specific prescript part. Therefore, if the shutdown preparation process, which a user desires to execute before shutdown, differs from user to user, a user can arbitrarily set the shutdown preparation process to be executed before shutdown, thereby improving usability.

Moreover, the multifunction peripheral 1 according to the present embodiment can set the shutdown process change condition though an operation applied to the operation part 4. Therefore, the shutdown process change condition can be set in response to a use condition of a user, which improves usability while improving safety of the multifunction peripheral 1.

The present invention is not limited to the specifically disclosed embodiments, and variations and modifications may be made without departing from the scope of the present invention.

The present application is based on Japanese priority application No. 2010-036120 filed on Feb. 22, 2010, the entire contents of which are hereby incorporated herein by reference.

What is claimed is:

1. An image processing apparatus comprising:
a power supply switch configured to be operated to send an instruction to supply a power or shut down the power supply;
a power control part configured to shut down the power supply after a predetermined power shutdown condition is established when the instruction to shut down the power supply is sent from said power supply switch;
a prescript safe state transition part configured to perform a prescript safe state transition process to shift a predetermined number of previously set prescript parts among parts of said image processing apparatus to a predetermined safe state in which the power supply is shut down in safe in accordance with a predetermined transition procedure;
a priority safe state transition part configured to perform a priority safe state transition process to shift a predetermined number of previously set priority parts among the parts of said image processing apparatus to said safe state in accordance with a predetermined transition procedure; and
a transition process control part configured to cause said prescript safe state transition process to be executed before execution of said priority safe transition process, and cause the priority safe state transition process to be executed when a predetermined transition change condition is established in the prescript safe state transition process,
wherein said power control part determines that said predetermined power shutdown condition is established when said prescript safe state transition process is completed, and shuts down the power supply after the completion of said prescript safe state transition process.

2. The image processing apparatus according to claim 1, further comprising a prescript part setting part configured to set a desired part among the parts of said image processing apparatus to said prescript part.

3. The image processing apparatus according to claim 1, wherein said transition process control part changes a process to execute from said prescript safe transition process to said priority safe transition process when said predetermined transition change condition is established, said predetermined transition change condition being defined as passage of a previously set transition time after the instruction to shut down the power supply is made by an operation applied to said power supply switch.

4. The image processing apparatus according to claim 1, wherein said transition process control part changes a process to execute from said prescript safe transition process to said priority safe transition process when said predetermined transition change condition is established, said predetermined transition change condition being defined as a completion of transition of a previously set specific prescript part to the safe state in said prescript safe state transition process.

5. The image processing apparatus according to claim 4, further comprising a specific prescript part setting part configured to set a desired part among the parts of said image processing apparatus as said specific prescript part.

6. The image processing apparatus according to claim 1, further comprising a condition setting part configured to set said transition change condition.

7. An image processing apparatus comprising:
power supply switch means to be operated for sending an instruction to supply a power or shut down the power supply;
power control means for shutting down the power supply after a predetermined power shutdown condition is established when the instruction to shut down the power supply is sent from said power supply switch means;
prescript safe state transition means for performing a prescript safe state transition process to shift a predetermined number of previously set prescript parts among parts of said image processing apparatus to a predetermined safe state in which the power supply is shut down in safe in accordance with a predetermined transition procedure;
priority safe state transition means for performing a priority safe state transition process to shift a predetermined number of previously set priority parts among the parts of said image processing apparatus to said safe state in accordance with a predetermined transition procedure; and
transition process control means for causing said prescript safe state transition process to be executed before execution of said priority safe transition process, and causing the priority safe state transition process to be executed when a predetermined transition change condition is established in the prescript safe state transition process, wherein said power control means determines that said predetermined power shutdown condition is established when said prescript safe state transition process is completed, and shuts down the power supply after the completion of said prescript safe state transition process.

8. The image processing apparatus according to claim 7, further comprising prescript part setting means for setting a desired part among the parts of said image processing apparatus to said prescript part.

9. The image processing apparatus according to claim 7, wherein said transition process control means changes a process to execute from said prescript safe transition process to said priority safe transition process when said predetermined transition change condition is established, said predetermined transition change condition being defined as passage of a previously set transition time after the instruction to shut down the power supply is made by an operation applied to said power supply switch.

10. The image processing apparatus according to claim 7, wherein said transition process control means changes a process to execute from said prescript safe transition process to said priority safe transition process when said predetermined transition change condition is established, said predetermined transition change condition being defined as a completion of transition of a previously set specific prescript part to the safe state in said prescript safe state transition process.

11. The image processing apparatus according to claim 10, further comprising specific prescript part setting means for setting a desired part among the parts of said image processing apparatus as said specific prescript part.

12. The image processing apparatus according to claim 7, further comprising condition setting means for setting said transition change condition.

* * * * *